US009088693B2

(12) United States Patent
Pham et al.

(10) Patent No.: US 9,088,693 B2
(45) Date of Patent: Jul. 21, 2015

(54) PROVIDING DIRECT EYE CONTACT VIDEOCONFERENCING

(71) Applicant: Polycom, Inc., San Jose, CA (US)

(72) Inventors: Tony Pham, Westborough, MA (US); Gopal Paripally, Andover, MA (US)

(73) Assignee: Polycom, Inc., San Jose, CA (US)

( * ) Notice: Subject to any disclaimer, the term of this patent is extended or adjusted under 35 U.S.C. 154(b) by 115 days.

(21) Appl. No.: 14/041,677

(22) Filed: Sep. 30, 2013

(65) Prior Publication Data

US 2014/0092200 A1   Apr. 3, 2014

Related U.S. Application Data

(60) Provisional application No. 61/706,875, filed on Sep. 28, 2012.

(51) Int. Cl.
*H04N 7/15* (2006.01)
*H04N 7/14* (2006.01)
(52) U.S. Cl.
CPC ............... *H04N 7/15* (2013.01); *H04N 7/144* (2013.01); *H04N 7/141* (2013.01); *H04N 7/142* (2013.01)

(58) Field of Classification Search
CPC .......... H04N 7/15; H04N 7/141; H04N 7/142
USPC .................... 348/14.07; 370/260; 709/204
See application file for complete search history.

(56) References Cited

U.S. PATENT DOCUMENTS

| 8,963,984 | B2 * | 2/2015 | Brady et al. | 348/14.03 |
| 8,970,655 | B2 * | 3/2015 | Paripally et al. | 348/14.07 |
| 2010/0149310 | A1 * | 6/2010 | Zhang et al. | 348/14.16 |
| 2012/0257004 | A1 * | 10/2012 | Smith et al. | 348/14.16 |
| 2013/0155176 | A1 * | 6/2013 | Paripally et al. | 348/14.07 |

* cited by examiner

*Primary Examiner* — Creighton Smith
(74) *Attorney, Agent, or Firm* — Blank Rome, LLP

(57) ABSTRACT

A videoconferencing unit comprises a display screen configured to display a video data stream comprising images of a far end participant. A processor is adapted to decode the video data stream and generate a modified region of the video data stream. The modified region of the video data stream is displayed on the display screen at a location where images of eyes of the far end participant are displayed on the display screen. A camera is configured with a lens to capture images of a near end participant through the modified region of the video data stream, with at least a portion of the lens positioned within the modified region of the video data stream.

24 Claims, 3 Drawing Sheets

PROVIDING DIRECT EYE CONTACT VIDEOCONFERENCING

CROSS REFERENCE TO RELATED APPLICATIONS

This application claims priority to U.S. Provisional Application Ser. No. 61/706,875, filed Sep. 28, 2012, which is incorporated by reference in its entirety herein.

BACKGROUND

The present disclosure relates generally to videoconferencing systems, and more particularly, to relates generally to communication systems, and more particularly to video conferencing units.

In recent years, there has been an increased awareness that something is missing from the experience provided by traditional group video teleconferencing, or more commonly, videoconferencing systems. Traditional videoconferencing systems typically include one or more monitors, or televisions, positioned on a movable cart, or stand, and a camera placed on top the television. A microphone and speaker are also provided for meeting audio needs. This common group room videoconferencing equipment arrangement is being challenged in its ability to provide a suitable telepresence experience.

Telepresence refers to a set of technologies which allow a person to feel as if they were present and to give the appearance of being present at a place other than their true location. Telepresence requires that the users' senses be provided with such stimuli as to give the feeling of being in that other location. Therefore information may be traveling in both directions between the user, or near end participant, and the remote location. The monitor(s) and camera(s) of traditional videoconferencing systems usually reside against the wall and are therefore outside the normal conversational space of the table. It is as if the person on the screen was placed at a chair outside the conversational dynamic that occurs at a meeting table.

Eye contact is an essential aspect of human communication. Studies have been conducted on the importance of eye contact and perception of eye contact in videoconferencing. Two directions of gaze have been analyzed: up and down (vertical) and left and right (horizontal) which is effected by where one looks in relation to the camera capturing their image. As is known, if the camera is placed at the top of the monitor, the image of the near end participant captured by camera will appear to the far end participant as if the near end participant is looking downwards. As a result, the far end participants will see the image of the near end participant looking not straight out at them, but undesirably downwards. If the far end videoconferencing unit has a similar setup, then the image of the far end participant captured by the far end camera also suffers from the same downward looking feature. In such cases, both the near end and far end participants will not be able to make direct eye contact with the images of the other end. Naturally, this is undesirable.

SUMMARY

In one general embodiment, a videoconferencing unit comprises a display screen configured to display a video data stream comprising images of a far end participant. A processor is adapted to decode the video data stream and generate a modified region of the video data stream. The modified region of the video data stream is displayed on the display screen at a location where images of eyes of the far end participant are displayed on the display screen. A camera is configured with a lens to capture images of a near end participant through the modified region of the video data stream, with at least a portion of the lens positioned within the modified region of the video data stream.

In another general embodiment, a videoconferencing unit comprises a display screen configured to display a video data stream comprising images of one or more far end participants. The display screen includes a display layer. A processor is adapted to decode the video data stream and generate a modified region thereof. The modified region of the video data stream is maintained at a selected location as the video data stream is displayed on the display screen, such that the modified region is positioned on the display screen where images of eyes of the one or more far end participants are displayed. The unit also includes a camera configured with a lens to capture images of one or more near end participants. The lens is configured complementary to the modified region of the video data stream to capture images of the one or more near end participants via the modified region of the video data stream.

In further general embodiment, a method of providing direct eye contact in a videoconference. The method comprises decoding an image of a far end participant to be displayed on a display screen and modifying a region of the decoded image of the far end participant to be displayed on the display screen. The method continues with displaying the decoded image of the far end participant on the display screen including the modified region, the modified region positioned on the display screen near a location where eyes of the far end participant are displayed and capturing an image of a near end participant, the image of the near end participant being captured through the modified region of the image of the far end participant displayed on the display screen.

In another general embodiment, a videoconferencing unit comprises a display screen configured to display a video data stream comprising images of one or more far end participants, the display screen includes a display layer. The unit further comprises a processor adapted to decode the video data stream and then generate more than one modified region of the video data stream, at least one of the more than one modified regions of the video data stream maintained at a predetermined position on the display screen as the video data stream is displayed where images of eyes of the one or more far end participants are displayed. Also included is a camera configured with a lens positioned behind the display layer of the display screen and dimensioned complementary to a modified region of the video data stream displayed on the display screen. The lens is adapted to capture images of one or more near end participants through the modified region of the video data stream.

DETAILED DESCRIPTION

The following description is made for the purpose of general illustration and is not meant to limit the inventive concepts claimed herein. Further, particular features described herein can be used in combination with other described features in each of the various possible combinations and permutations.

Figure 1:
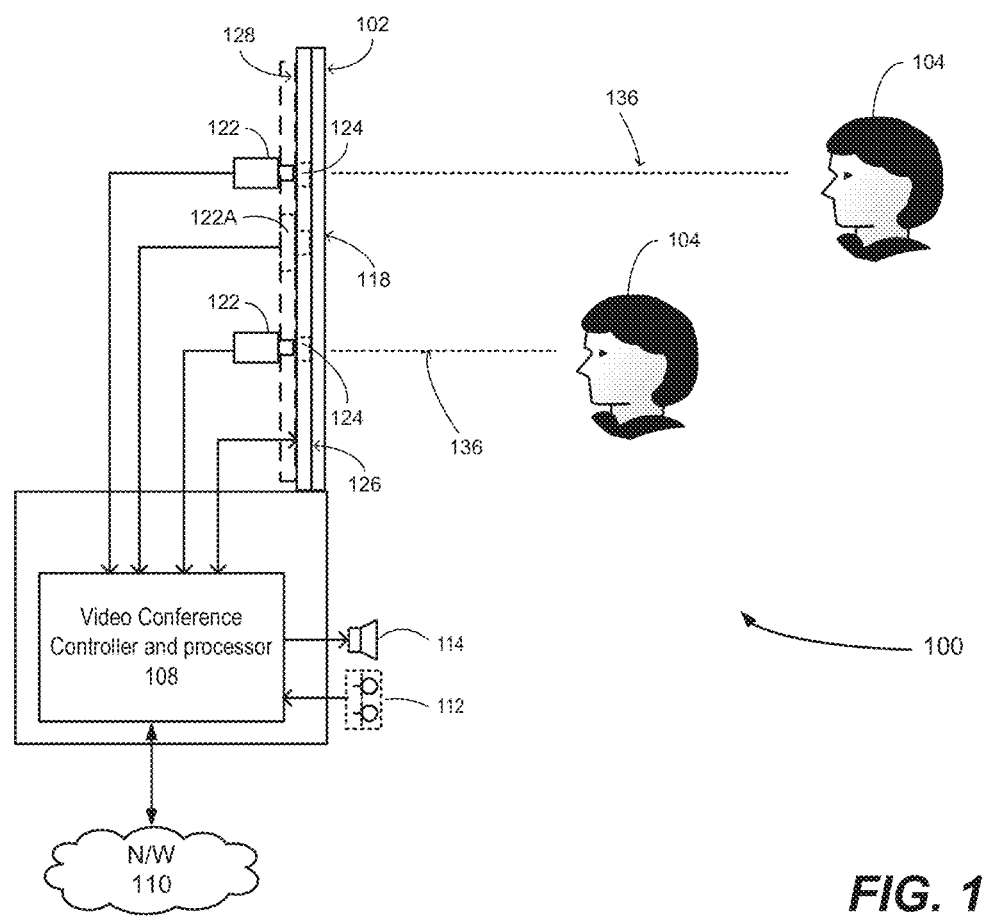
FIG. 1 illustrates a simplified block diagram of an embodiment of a system for a direct eye contact videoconferencing unit.
Figure 2:
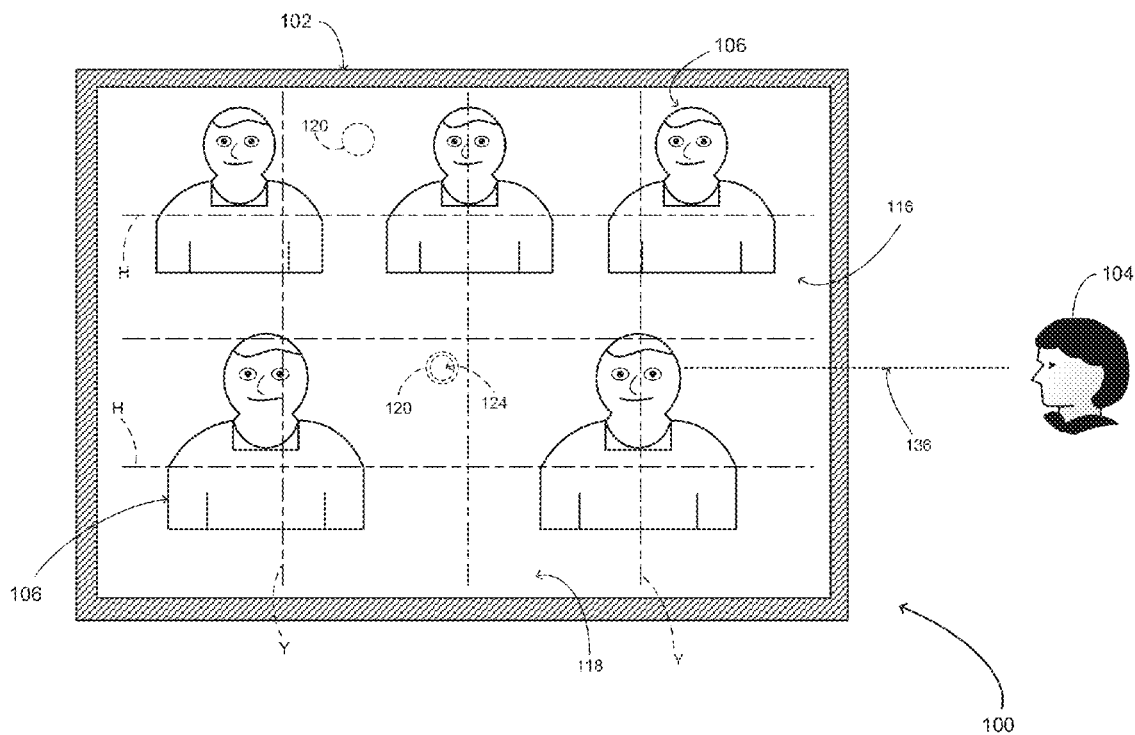
FIG. 2 illustrates an embodiment of a system for a direct eye contact videoconferencing unit showing a near end participant viewing far end participants on a display device.

As illustrated in FIG. 1 and FIG. 2, there is shown, generally at 100, an embodiment of a system for providing direct eye contact videoconferencing. The system 100 can include a display device 102 positioned in front of one or more users 104, which display screen 102 displays video images of far end participants 106. The display device 102 can be a projection-type, an LCD or plasma flat panel, a CRT-based display, etc. The system 100 can also include a processor 108 that may be coupled to a network 110, one or more microphones 112 for capturing audio signals (e.g., voice) of near end participants, or users, 104, and a speaker 114 for converting audio signals received from the far end participants 106 into sound.

Figure 3:
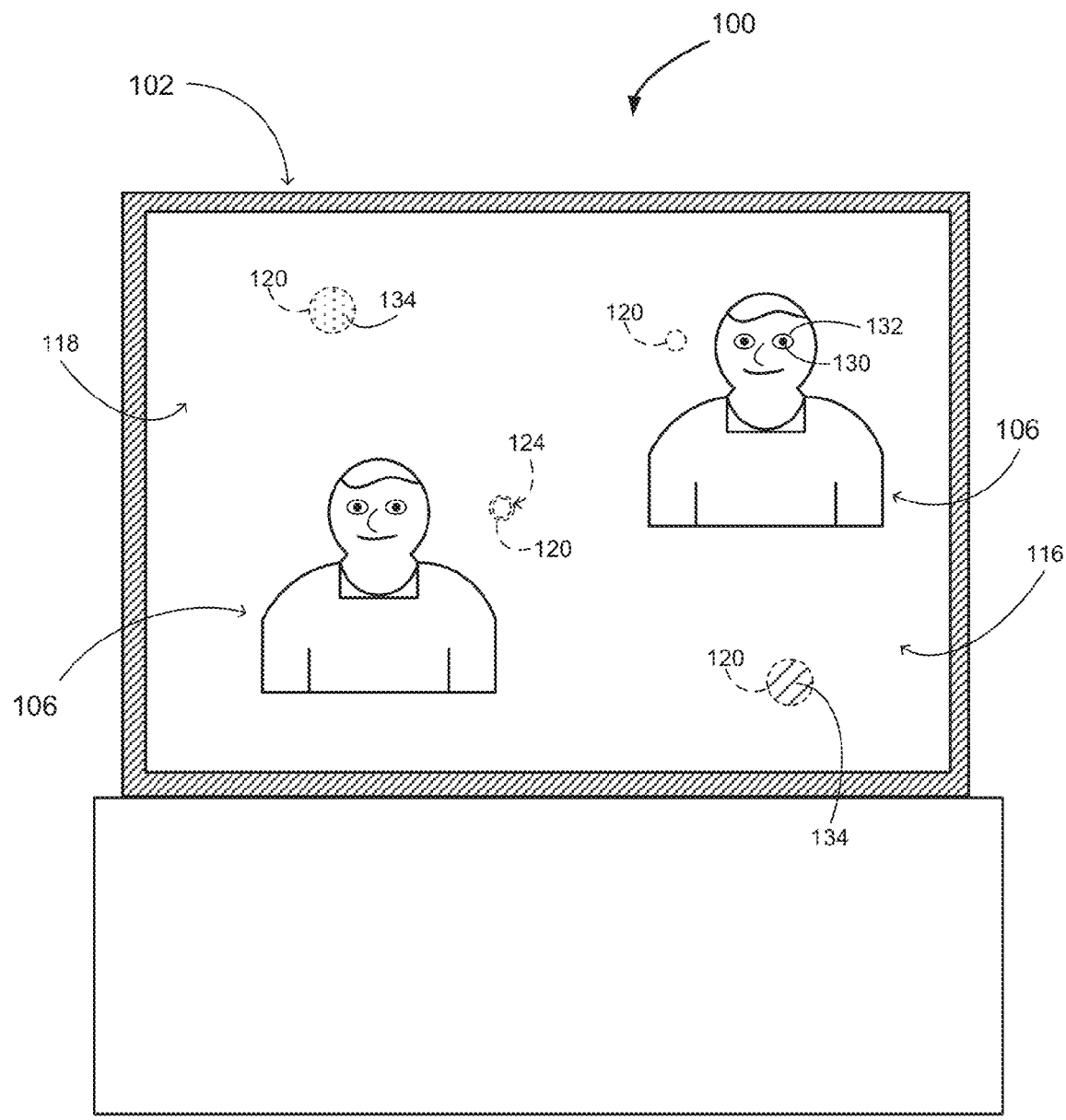
FIG. 3 illustrates an embodiment of a system for a direct eye contact videoconferencing unit showing an image of a video data stream displayed on a display device.

The system 100 can be connected to a far end videoconferencing unit via the network 110. The processor 108 receives video image data, such as a video data stream, shown generally at 116 in FIG. 2, and audio data from a far end videoconferencing unit and processes the data for displaying video of the far end participants 106 on a display screen 118 of the display device 102 and converting audio signals received from far end participants 106. The processor 108 can decode the video data stream 116 and generate a modified portion, or region 120, of the video data stream 116. Optionally, the processor 108 can decode the video data stream 116 and generate more than one modified region 120. While two modified regions 120 of the video data stream 116 are shown in FIG. 2, and four modified regions 120 are shown in FIG. 3, it is to be understood that a plurality of modified regions 120 may be generated. For example, one or more modified regions 120 may be generated for the image of each far end participant 106 displayed on the display screen 118.

Each modified region 120 of the video data stream 116 can be maintained at a selected location on the display screen 118, as the video data stream 116 is displayed. For example, each modified region 120 may be maintained at one or more selected locations along horizontal axes H of and vertical axes Y of the screen 118, such that one or more modified regions 120 are positioned on the screen 118.

As illustrated in FIG. 1 and FIG. 2, the system 100 can include one or more cameras 122 coupled to the display device 102 and processor 108. In the embodiments, each camera 122 includes a lens 124 that is positioned behind a display layer 126 of the display screen 118. The camera lenses 124 are maintained in a desired position behind a display layer 126 using known means. Optionally, the camera lenses 124 may be positioned between the display layer 126 and a backlight layer 128 of the display device 102, if the display device 102 comprises a Liquid-crystal display (LCD) or other display device that utilizes backlight technology. In an optional embodiment, a body 122A of the camera may be positioned entirely within the display device 102.

As shown in FIG. 2 and FIG. 3, The processor 108 can decode the video data stream 116 and generate a number of modified regions 120. Each modified region 120 may comprise any desired two-dimensional shape. Exemplarily shapes may include square, rectangular, circular, among other well-known shapes. In some embodiments, one or more modified regions 120 may be configured complementary to the camera lens 124. The modified regions 120 may be dimensioned complementary to the camera lens 124, to allow the camera 122 to capture images of the one or more near end participants 104 through the modified regions 120 of the video data stream 116. One or more the modified regions 120 of the video data stream 116 may be positioned on the display screen 118, such that they are maintained within a pupil 130 of an eye 132 of the images of the one or more far end participants 106.

As illustrated in FIG. 3, one or more pixel patterns 134 may be generated in each modified region 120 to conceal the lens 124 of the camera 122 from the one or more near end participants 104. The processor 108 can decode the video data stream 116 and generate one or more pixel patterns 134 that can conceal the camera lenses 124 from the near end participants 104, while allowing the camera 122 to capture images of the near end participants 104. Known pixel patterns may be used including total black, total white, and other suitable pixel patterns.

As illustrated in the Figures, and particularly in FIG. 2 and FIG. 3, during a videoconferencing session, the one or more near end participants 104 view images of the one or more far end participants 106 displayed on display screen 118 along a line of sight 136. Thus, the near end participants 104 are able to gaze directly at the images of the far end participants 106. As the video data stream 116 is displaying the images of the far end participants 106, the cameras 122 are capturing images of the near end participants 104 looking directly at the screen 118 and far end participants 106, via the modified regions 120. The near end participants 104 are able to maintain direct eye contact with the far end participants 106 during the videoconferencing session, providing an improved experience for both the near end participants 104 and far end participants 106.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A videoconferencing unit comprising:
a display screen configured to display a video data stream comprising images of a far end participant;
a processor adapted to decode the video data stream and generate a modified region of the video data stream, the modified region of the video data stream displayed on the display screen at a location where images of eyes of the far end participant are displayed on the display screen; and
a camera configured with a lens to capture images of a near end participant through the modified region of the video data stream, at least a portion of the lens positioned within the modified region of the video data stream.

2. The videoconferencing unit of claim 1 wherein the modified region of the video data stream is maintained at a selected location relative to the display screen as the video data stream is displayed on the display screen.

3. The videoconferencing unit of claim 1 wherein the modified region of the video data stream is modified to conceal the lens of the camera from the near end participant.

4. The videoconferencing unit of claim 3 wherein the modified region of the video data stream is modified with one or more pixel patterns to conceal the lens of the camera from the near end participant.

5. The videoconferencing unit of claim 1 wherein the lens adapted to be positioned within the modified region of the video data stream to capture images of the near end participant as the video data stream is displayed on the display screen.

6. The videoconferencing unit of claim 1 wherein the lens is positioned behind the display screen.

7. A videoconferencing unit comprising:
a display screen configured to display a video data stream comprising images of one or more far end participants, the display screen including a display layer and a backlight layer;
a processor adapted to decode the video data stream and generate a modified region thereof, the modified region of the video data stream maintained at a selected location as the video data stream is displayed on the display screen, such that the modified region is positioned on the display screen where images of eyes of the one or more far end participants are displayed; and
a camera configured with a lens to capture images of one or more near end participants, the lens configured complementary to the modified region of the video data stream to capture images of the one or more near end participants via the modified region of the video data stream.

8. The videoconferencing unit of claim 7 further comprising:
the processor adapted to decode the video data stream and generate one or more modified region of the video data stream, each modified region of the video data stream being maintained at a selected location as the video data stream is displayed on the display screen, such that one or more modified regions are positioned on the display screen where images of eyes of the one or more far end participants are displayed.

9. The videoconferencing unit of claim 8 wherein in a lens is provided for each modified region of the video data stream, each lens positioned to capture images of the one or more near end participants via the modified region of the video data stream.

10. The videoconferencing unit of claim 8 wherein each modified region of the video data stream is modified with one or more pixel patterns to conceal the lens within the modified region from the one or more near end participants while allowing the lens to capture images of the one or more near end participants.

11. The videoconferencing unit of claim 7 wherein the lens is positioned behind the display layer.

12. The videoconferencing unit of claim 7 wherein the display screen comprises a selected on of an organic light-emitting diode display device and a light-emitting diode display device.

13. A videoconferencing unit comprising:
a display screen configured to display a video data stream comprising images of one or more far end participants, the display screen including a display layer;
a processor adapted to decode the video data stream and then generate more than one modified region of the video data stream, at least one of the more than one modified regions of the video data stream maintained at a predetermined position on the display screen as the video data stream is displayed where images of eyes of the one or more far end participants are displayed; and
a camera configured with a lens positioned behind the display layer of the display screen and dimensioned complementary to a modified region of the video data stream displayed on the display screen, the lens adapted to capture images of one or more near end participants through the modified region of the video data stream.

14. The videoconferencing unit of claim 13 wherein each modified region of the video data stream is maintained at a selected location as the video data stream is displayed on the display screen, such that one or more modified regions are positioned on the display screen where images of eyes of the one or more far end participants are displayed.

15. The videoconferencing unit of claim 14 wherein one or more modified regions of the video data stream are maintained at one or more selected locations along a horizontal axis of the display screen and one or more modified regions of the video data stream are maintained at one or more selected locations along a vertical axis of the display screen, such that more than one modified region is positioned on the display screen along at least one of the horizontal axis and vertical axis of the display screen.

16. The videoconferencing unit of claim 15 wherein a plurality of modified regions of the video data stream are maintained at a plurality selected locations along at least one of the horizontal axis and vertical axis of the display screen.

17. The videoconferencing unit of claim 16 wherein the plurality of modified regions of the video data stream are maintained at a plurality selected locations where images of eyes of the one or more far end participants are displayed.

18. The videoconferencing unit of claim 13 wherein each modified region of the video data stream is modified with one or more pixel patterns to conceal the lens within the modified region from the one or more near end participants while allowing the lens to capture images of the one or more near end participants.

19. The videoconferencing unit of claim 13 wherein in a lens is provided for each modified region of the video data stream, each lens positioned behind the display layer.

20. The videoconferencing unit of claim 13 wherein the display screen comprises a selected on of an organic light-emitting diode display device and a light-emitting diode display device.

21. A method of providing direct eye contact in a videoconference, the method comprising:
decoding an image of a far end participant to be displayed on a display screen;
modifying a region of the decoded image of the far end participant;
displaying the decoded image of the far end participant on the display screen including the modified region, the modified region positioned on the display screen near a location where eyes of the far end participant are displayed; and
capturing an image of a near end participant, the image of the near end participant being captured through the modified region of the image of the far end participant displayed on the display screen.

22. The method of claim 21 further comprising:
generating one or more pixel patterns for the modified region of the decoded image to conceal a lens behind the display screen, the lens adapted to capture the image of the near end participant via the modified region of the decoded image.

23. The method of claim 21 further comprising:
modifying a plurality of regions of the decoded image; and
maintaining each of the plurality of modified regions of the decoded image at a selected location on the display screen as the decoded image is displayed, the plurality of regions of the decoded image being maintained such that one or more modified regions are positioned on the display screen where images of eyes of one or more far end participants are displayed.

24. The method of claim 23 further comprising:
providing a plurality of lenses, one lens provided for each modified region of the decoded image stream for capturing images of one or more near end participants; and
generating one or more pixel patterns for each modified region of the video data stream to conceal the lens behind the display screen.

* * * * *